| (12) | United States Patent | (10) Patent No.: | US 9,339,832 B2 |
|---|---|---|---|
| | Schrof et al. | (45) Date of Patent: | May 17, 2016 |

(54) SPRAYGUN FOR PRODUCING CURED COATING FILMS AND METHODS OF USE THEREOF

(71) Applicant: BASF SE, Ludwigshafen (DE)

(72) Inventors: Wolfgang Schrof, Neuleiningen (DE); Thomas Meier, Mannheim (DE); Christian Michael Jung, Freinsheim (DE); Antoine Carroy, Limburgerhof (DE); Werner-Alfons Jung, Ascheberg (DE); Peter Hoffmann, Senden (DE); Tobias Hintermann, Therwil (CH); Caroline Lordelot, Mannheim (DE); Olof Wallquist, Bottmingen (CH)

(73) Assignee: BASF SE, Ludwigshafen (DE)

( * ) Notice: Subject to any disclaimer, the term of this patent is extended or adjusted under 35 U.S.C. 154(b) by 10 days.

(21) Appl. No.: 13/827,142

(22) Filed: Mar. 14, 2013

(65) Prior Publication Data

US 2013/0251911 A1    Sep. 26, 2013

Related U.S. Application Data

(60) Provisional application No. 61/614,021, filed on Mar. 22, 2012.

(51) Int. Cl.
| B05C 9/10 | (2006.01) |
| B05D 3/06 | (2006.01) |
| B05B 7/02 | (2006.01) |
| B05B 15/00 | (2006.01) |
| B05D 1/02 | (2006.01) |
| B05B 7/22 | (2006.01) |
| B05B 1/30 | (2006.01) |

(Continued)

(52) U.S. Cl.
CPC .............. *B05B 15/00* (2013.01); *B05B 1/3046* (2013.01); *B05B 7/0441* (2013.01); *B05B 7/228* (2013.01); *B05C 9/10* (2013.01); *B05D 1/02* (2013.01); *B05D 3/06* (2013.01); *B05D 3/061* (2013.01); *C09D 4/00* (2013.01); *C09D 175/04* (2013.01)

(58) Field of Classification Search
None
See application file for complete search history.

(56) References Cited

U.S. PATENT DOCUMENTS

| 1,880,331 | A | * | 10/1932 | Rapp ............................... 239/82 |
| 3,133,828 | A | | 5/1964 | Slatkin |

(Continued)

FOREIGN PATENT DOCUMENTS

| DE | 37 02 999 A1 | 8/1988 |
| DE | 199 61 990 A1 | 7/2001 |

(Continued)

OTHER PUBLICATIONS

International Search Report issued Jul. 24, 2013, in International Application No. PCT/EP2013/055808 (with English translation of Category of Cited Documents).

(Continued)

*Primary Examiner* — Binu Thomas
(74) *Attorney, Agent, or Firm* — Servilla Whitney LLC

(57) ABSTRACT

Described is a method and an apparatus for producing cured coating films on a substrate surface. Specifically, a portable spraygun may be used to initiate radiation cure without the operative having to be protected from radiation. The spraygun comprises a supply channel for a radiation-curable coating composition, a needle, a reserve for the radiation-curable coating composition, and, optionally, a supply channel for a gas.

18 Claims, 1 Drawing Sheet

(51) Int. Cl.
    *B05B 7/04*       (2006.01)
    *C09D 4/00*       (2006.01)
    *C09D 175/04*     (2006.01)

(56) References Cited

U.S. PATENT DOCUMENTS

| | | | |
|---|---|---|---|
| 4,880,662 A | 11/1989 | Habrich et al. | |
| 4,970,399 A * | 11/1990 | Habrich et al. | 250/435 |
| 5,332,159 A * | 7/1994 | Grime et al. | 239/412 |
| 6,736,898 B2 | 5/2004 | Schrof et al. | |
| 2002/0015799 A1 * | 2/2002 | Schrof et al. | 118/620 |
| 2006/0108450 A1 * | 5/2006 | Klinkenberg et al. | 239/525 |
| 2007/0277700 A1 | 12/2007 | Wagenblast et al. | |
| 2008/0032037 A1 | 2/2008 | Frey et al. | |
| 2008/0305273 A1 * | 12/2008 | Templeman et al. | 222/190 |
| 2009/0092764 A1 * | 4/2009 | Hoeckelman | 118/642 |
| 2010/0284026 A1 * | 11/2010 | Reuter | 356/614 |
| 2012/0097764 A1 * | 4/2012 | Larson | 239/303 |

FOREIGN PATENT DOCUMENTS

| | | |
|---|---|---|
| DE | 19961990 | 7/2001 |
| DE | 37 02 999 C2 | 3/2003 |
| DE | 10 2009 052 656 A1 | 5/2011 |
| DE | 10-2009-052656 | 5/2011 |
| EP | 0 393 407 A1 | 10/1990 |
| EP | 1 002 587 A2 | 5/2000 |
| EP | 1002587 | 5/2000 |
| EP | 1 074 307 A2 | 2/2001 |
| EP | 1 074 307 A3 | 2/2001 |
| EP | 1074307 | 2/2001 |
| EP | 1 592 522 B1 | 6/2006 |
| JP | 61-098740 | 5/1986 |
| JP | 61-98740 A | 5/1986 |
| JP | 07-227567 | 8/1995 |
| JP | 7-227567 A | 8/1995 |
| JP | 2007-083166 | 4/2007 |
| JP | 2007-83166 A | 4/2007 |
| WO | WO 2005/085372 A1 | 9/2005 |
| WO | WO 2005/119208 A1 | 12/2005 |
| WO | WO 2009/050115 A1 | 4/2009 |
| WO | WO 2011/032837 A1 | 3/2011 |
| WO | WO 2011/032875 A1 | 3/2011 |
| WO | WO 2012/136606 A1 | 10/2012 |
| WO | WO 2013/104771 A1 | 7/2013 |

OTHER PUBLICATIONS

PCT International Search Report in PCT/EP2013/055808, mailed Jul. 24, 2013, 2 pages.

* cited by examiner

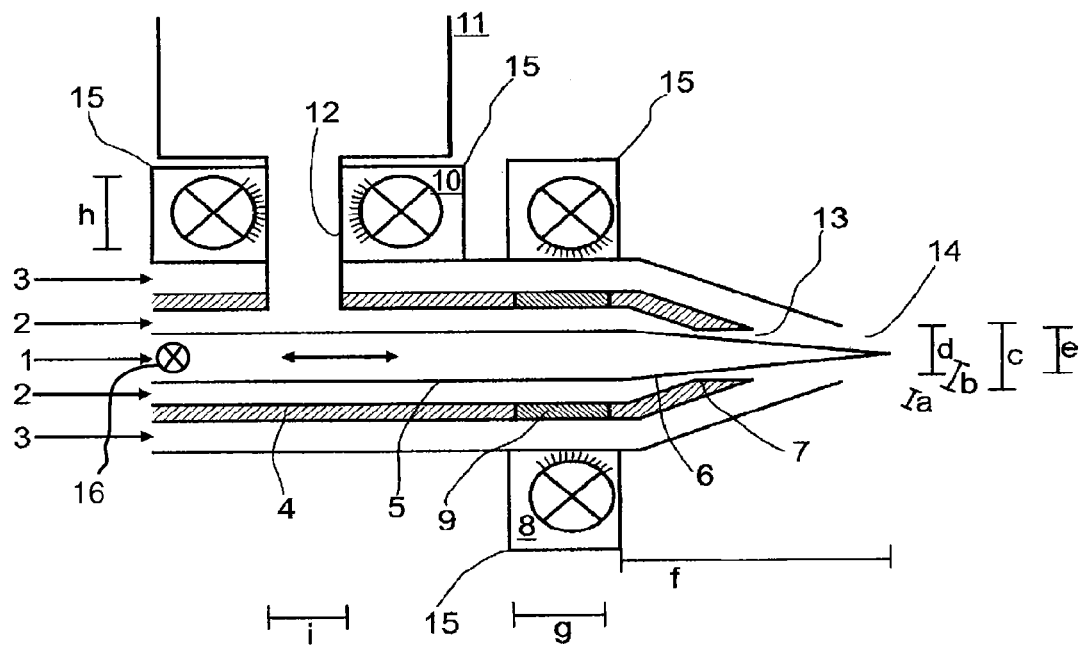

SPRAYGUN FOR PRODUCING CURED COATING FILMS AND METHODS OF USE THEREOF

The present invention relates to a method and apparatus for producing cured coating films on a substrate surface.

The construction of conventional sprayguns is generally such that the coating material is conveyed from a reservoir into the spraygun, in which it is passed along a needle through a channel in the shape of an annular gap, and is distributed, at the nozzle, formed by needle tip and casing, by a stream of gas, inert gas or compressed air (called spraying air). It is possible to widen the form of the spray cone by means of a gas feed present in addition to the nozzle, as for example by means of so-called horn air. Also known are paint-spraying methods with airless atomization, in which, in contrast to air atomization, the coating composition is atomized solely via the pressure of the material. For this purpose, the coating composition is forced under pressure through a nozzle bore, which breaks up the material into a spray jet. Typically, with a spraygun, a coating material is merely applied to a substrate; curing then takes place following application, in a separate step, by baking of the coating material or by radiation curing, for example.

U.S. Pat. No. 3,133,828 describes a method of applying a coating material to large substrates, such as automobile bodies, where the coating material is activated prior to application to the substrate.

A disadvantage is that the apparatus is immobile and cannot easily be made smaller.

JP 61-098740, JP 07-227567, EP 393407, and JP 2007-083166A describe the general possibility of exposing coating material to light before its passage through a spraygun, without disclosing details concerning the nature and location of the exposure.

DE 19961990 describes a method of forming a component by pressing a material for curing into a mold and initiating the curing beforehand.

DE 3702999 describes the curing of UV reactive resin materials, the material being passed through a channel which is exposed either from outside (FIG. 1 there) or from behind (FIG. 2 there) by a light guide. The resin materials are used for adhesive bonding. Under the stated conditions, the UV reactive resins described in this case are curable only on account of the fact that the residence time in the exposure unit is made relatively long. As a result of the low exposure intensity of commercial units, the volume flow rates achievable are low.

A disadvantage in the case of the latter variant is that UV radiation may also penetrate to the outside along the channel. This may give rise to additional cost and complexity for UV protection measures, and/or may lead to unwanted cured deposits at the end of the channel. Furthermore, in the examples explicitly disclosed, exposure times of 5 seconds and 10 seconds, respectively, are disclosed, thereby making the systems disclosed therein, composed of exposure apparatus and coating material, unsuitable for sprayguns. Moreover, distribution of the tackifying resin materials by spraying is not envisaged and, in view of the high viscosity of such resin materials, it is also not at all possible.

EP 1002587 A discloses the exposure of radiation-curable coating materials in a spraygun and thus the curing, or initiation of curing, of the applied coating material during application to the substrate.

A disadvantage of the solution presented there is that the spraygun has to be converted, in a costly and inconvenient operation, by mounting the light guides at the exit aperture of the nozzle.

Known from EP 1592522 is the modification of commercial sprayguns such that they are provided with an extension which is directed onto the substrate, in other words in the same direction as the spray jet. In this way, external light exposure of the spray jet and/or of the coated substrate can be carried out, in order thus to carry out or initiate curing.

A disadvantage is that, as a result of the external light exposure, the coating operative must be protected from the UV radiation. Furthermore, as a result of the irradiating unit mounted at the outlet, the spraygun becomes unwieldy. Moreover, the extensive UV exposure of a mist of droplets is costly and inconvenient, and the irradiation of the substrate is uneven.

It was an object of the present invention, therefore, to develop a portable spraygun which can be used to initiate a radiation cure without the operative having to be protected from radiation. Commercial sprayguns are to be easily modified in a simple form.

This object has been achieved by means of a portable spraygun comprising
- at least one, preferably precisely one, supply channel 2 for at least one, preferably precisely one, radiation-curable coating composition,
- optionally at least one, preferably precisely one, supply channel 3 for a gas,
- a needle 1 which can be moved in longitudinal direction and can be used to seal off the at least one supply channel 2, which forms an annular gap around the needle 1, with respect to the outlet 13 of the supply channel 2,
- the optional at least one supply channel 3 for a gas, and the at least one supply channel 2, being disposed such that the at least one radiation-curable coating composition, passed from the at least one supply channel 2 through the outlet 13, is atomized by the gas from the optional at least one supply channel 3, or, in the absence of the optional supply channel 3, the at least one radiation-curable coating composition is atomized by physical forces; further, a reserve 11 for the at least one coating composition, having a feedline 12 from the reserve 11 to the supply channel 2,
- in which the needle 1 is designed such that it is transmissive for electromagnetic radiation which can be used to initiate curing of the at least one radiation-curable coating composition, and/or
- the feedline 12 is transparent for electromagnetic radiation, and a lighting unit 10 is mounted on the feedline 12.

In one embodiment of the present invention, the electromagnetic radiation is introduced into the spraygun through the needle 1 of the invention.

An advantage of the present invention is that commercial sprayguns can be used and can easily be modified by replacing the existing needle of the commercial spraygun, usually consisting of metal, by the needle 1 of the invention, which is transmissive for electromagnetic radiation.

BRIEF DESCRIPTION OF THE DRAWING

FIG. 1 is a schematic view of the spraygun according to the present invention.

The needle 1 of the invention, which is transmissive for electromagnetic radiation, is preferably manufactured so as to have the same diameter and the same tip geometry as the original, conventional needle. If desired, the tip geometry can be modified slightly, as for example by altering the conical angle or incorporating one or more shoulders or grooves into the tip.

Otherwise, the dimensions of the needle 1 and of the needle tip are based on those of the original needle. The diameter of the needle (identified as e in FIG. 1) may amount preferably to from about 0.5 to 10, more preferably 2 to 5 mm. In certain cases, smaller diameters are also possible.

It is essential to the invention that the needle 1 is manufactured from a material which is transmissive for electromagnetic radiation in the wavelength range which is needed in order to initiate curing in the at least one radiation-curable coating material.

Transmissive materials of this kind may be, for example, quartz, polymethyl methacrylate (Plexiglas®) or other transparent plastics, examples being polycarbonate (PC), polyethylene (PE), and polypropylene (PP), sapphire glass, calcite, glass, and also hollow bodies with transparent inlet and outlet surfaces; a preferred material is quartz. When UV light is being used, there ought to be a significant transparency for the wavelength range of below 450 nm.

It is generally and preferably sufficient if only the surface of the needle 1 at the tip, identified as 6 in FIG. 1, is designed to be transmissive for electromagnetic radiation. In the spraygun of the invention, therefore, the section f in FIG. 1 is preferably exposed and is available for activation of the photoinitiator I in the at least one coating composition.

The length of the section f is preferably between 1 and 30 mm, more preferably between 2 and 20, and very preferably between 4 and 15 mm.

In one preferred embodiment of the present invention, along the exposure section f, the surface 7 opposite the surface 6 in the supply channel 2 is reflective for the radiation employed. The effect of this is to utilize the electromagnetic radiation more efficiently.

The body of the needle, which is transparent for the radiation employed, acts as a radiation guide. There is therefore no additional advantage if the outer surface of the cylindrical portion of the needle 1, identified as 5 in FIG. 1, is also transmissive for electromagnetic radiation. This generally entails disadvantages, since domains with a very low flow of material would be exposed and would cure within the gun.

On the reverse side, the needle 1 is connected to a lighting unit 16, which emits electromagnetic radiation effectively, at least in the desired wavelength range, into the radiation guide of the needle.

The lighting unit may be sited directly on the needle 1 or, preferably, may be connected to it, more preferably by means of a light guide.

Examples of suitable lighting units include low-pressure mercury lamps, medium-pressure mercury lamps or high-pressure mercury lamps, and also fluorescent tubes, pulsed emitters, metal halide lamps, excimer emitters, and also light-emitting diodes (LEDs), laser diodes, and other laser systems. The radiation cure is performed by exposure to high-energy radiation, in other words IR, NIR or UV radiation or daylight, preferably UV radiation.

The desired wavelength range A which is emitted by the lighting unit must encompass the wavelength range with which the radiation cure is to be performed. This wavelength range ought preferably to encompass the absorption spectrum, and with particular preference the activation spectrum, of the at least one photoinitiator I used in the coating composition (see below). For example, the desired wavelength range may encompass 200 to 2500 nm, preferably 200 to 2000, more preferably 200 to 1500, very preferably 200 to 1000, more particularly 200 to 780 nm, especially 340 to 500 nm.

The radiation dose introduced ought in the case of UV curing to be situated preferably in the range from 80 to 30 000 $mJ/cm^2$.

In one preferred embodiment of the present invention, the lighting unit comprises one or more LEDs which emit in the UV range, more preferably LEDs or LED systems which emit UV light in the wavelength range of 365-450 nm.

Where two or more lighting units, preferably LEDs, are used, as for example 2 to 100, preferably 2 to 50, more preferably 3 to 25, and very preferably 3 to 16, it may be necessary to adapt the irradiated diameter of the lighting unit to the diameter of the needle 1; this is accomplished preferably by an adapter unit or converging lens.

A particular advantage of LEDs is that on account of their low physical size they can be sited directly on the needle or on the body of the spraygun, and do not have to be connected to the needle 1 via a light guide.

The needle 1 is configured so as to be movable lengthwise, and so it is able to close the at least one supply channel 2 for the at least one coating composition against the outlet 13 having the diameter d, by movement, and in this way is able to regulate and prevent the spraying of the coating composition. It will be appreciated that, for the purpose of closing the outlet 13, the diameter e must be greater than d, particularly in the region of the outlet 13.

The supply channel 2 is typically arranged in the form of an annular gap around the needle 1, but the precise disposition of the supply channel 2 is not essential to the invention; other dispositions of the supply channel 2 are also conceivable, and may have an equivalent effect.

The width of the supply channel 2 between needle 1 and wall 4 is identified as a in FIG. 1 and can be 0.05 to 5 mm, preferably from 0.1 to 1.5 mm, and more preferably from 0.1 to 1 mm.

Optionally, on the side of the outlet 13 remote from the needle 1, through at least one further supply channel 3, at least one spraying gas is supplied, the effect of which spraying gas is to atomize the at least one coating composition.

An optional possibility is to provide an additional outlet in spraying direction for so-called horn air on the spraygun of the invention, with which the spray cone generated can be shaped after leaving the nozzle 14 for the purpose of producing a particular spray pattern.

Furthermore, it is possible, as an option, to give the spraygun an airless configuration—that is, there is no need for the supply channel 3 for the spraying gas, and the coating composition is atomized without the feeding of a gas, the liquid coating composition within the supply channel 2 instead being caused to rotate vigorously so that it is atomized on leaving the outlet 13.

The preferred embodiment, however, is that in which the at least one supply channel 3 is present and in which spraying gas is supplied through said channel.

The supply channel 3 is typically arranged in the form of an annular gap around the jet of the at least one coating composition that is emerging from the outlet 13, but the precise disposition of the supply channel 3 is not essential to the invention; other dispositions of the supply channel 3 are also conceivable, and may have an equivalent effect.

The width of the supply channel 3 is identified by b in FIG. 1 and can be from 0.1 to 5 mm, preferably from 0.2 to 4 mm, and more preferably from 0.3 to 3 mm.

The at least one gas which is supplied through the supply channel 3 is preferably air, though it is also conceivable to use a different gas, as for example an inert gas, such as nitrogen or carbon dioxide.

The at least one gas which is supplied through the supply channel 3 is typically supplied via a line from a reservoir outside the spraygun, preferably in a compressed form, to the supply channel 3. The at least one gas is typically conveyed into the spraygun with a superatmospheric pressure of up to 5 bar, preferably up to 3 bar, more preferably at 2 bar.

The two supply channels 2 and 3 are separated from one another by a wall 4.

The design of the nozzle 14 with the width c is not essential to the invention, the decisive factor being the effect in terms of the atomizing of the at least one coating composition in a manner such that the coating composition can be applied in the desired way to the substrate.

In a further embodiment of the present invention, the coating composition is exposed to light on the section between reserve 11 and the outlet of the spraygun. This may be in addition to or instead of the embodiment in which electromagnetic radiation is introduced through the needle 1 of the invention into the spraygun. It is preferred to expose the coating composition to light on the section between reserve 11 and outlet of the spraygun.

The at least one radiation-curable coating composition which is supplied through the supply channel 2 may alternatively be supplied via a line from a reservoir outside the spraygun into the supply channel 2, or else via a reserve 11 which is directly connected to the spraygun. In both cases it is possible for the feedline 12 from the external reservoir or from the reserve 11 to the supply channel 2 to be transparent for electromagnetic radiation over a section h, so that further electromagnetic radiation may be introduced into the at least one coating composition via a lighting unit 10.

The lighting unit 10, with exposure from one side, from both sides or in an annular arrangement around the feedline 12, may be fitted or mounted, for example, as a flat connecting piece between the reservoir tank and the spraygun itself. This connecting piece may be molded or injected from transparent polymer, for example, and may be designed in such a way as to be replaceable on account of possible caking of coating composition or degradation of the transparent material. A connecting piece of this kind may have different diameters i, in order to allow a depth of penetration of the electromagnetic radiation into the radiation-curable coating composition that is sufficient to start the curing, in dependence on different photoinitiators and different concentrations of photoinitiators and/or different volume flow rates.

The illuminated area of the lighting unit may vary in size, hence allowing different numbers of light sources, such as LEDs, to be mounted. There may be a ring of lighting units around the feedline 12, or alternatively the feedline may be lit and in the form of a hose, if the reserve 11 is not mounted directly onto the spraygun, the coating composition instead being supplied from a more distant reservoir facility. Another embodiment comprises a hose as feedline 12, with replaceable, preferably plane-parallel, transparent windows, preferably made from a transparent injection-molded plastic, onto which the LEDs are fitted. This allows the windows to be easily replaced in the event of sticking, with the LEDs being re-used.

The feedline 12 may therefore have a length of from a few millimeters up to several meters, and the lit section h therein may encompass a part of this section up to the entire section 12.

This allows different residence times with volume flow rates that are nevertheless practically oriented. Furthermore, static mixers accommodated in the lit section may even out the residence time of the coating compositions near to the marginal zones, with higher exposure intensities, and may prevent unexposed volume elements being sprayed and later giving rise to non-crosslinked areas of coating material.

The lighting unit 10 may preferably emit in the same wavelength range as the electromagnetic radiation supplied through the needle 1. It is also conceivable, however, to irradiate in a different wavelength range, provided that the at least one coating composition comprises a photoinitiator I which can be activated in this other wavelength range.

The two embodiments of the present invention (exposure through the needle 1 and/or exposure between the reserve 11 and the spraygun) may be used both jointly or independently of one another in the spraygun of the invention. Preference is given to exposure between reserve 11 and spraygun, optionally supplemented by exposure through the needle 1.

In order to raise the irradiated dose of electromagnetic radiation, it is possible optionally to dispose at least one further lighting unit 8 in such a way that it irradiates the supply channel 2 from outside to inside. For this purpose it is necessary for the wall 4 in the region of the lighting unit 8 to be provided with a transparent window 9 having a length g, said window being transmissive, within the wavelength range relevant for the photoinitiator, for the electromagnetic radiation emitted by the lighting unit 8.

With a low depth of penetration of the curing radiation, the channel shape for the coating material can be made extensive and thin. To this end, the supply channel 12 may be divided into thin individual channels, each of which is irradiated.

Furthermore, the channel 2 may be given a thin-layer configuration.

The lighting unit 8 may emit preferably in the same wavelength range as the electromagnetic radiation supplied through the needle 1. It is, however, also conceivable to irradiate in a different wavelength range, provided the at least one coating composition comprises a photoinitiator I which can be activated in this other wavelength range.

The at least one coating composition—for example, one to three, preferably one or two, and more preferably precisely one coating composition—is of the kind whose curing can be carried out, or at least initiated, by electromagnetic radiation.

By "curing" is meant a polymerization of low molecular mass constituents present in the coating composition, with a construction of high molecular mass compounds. This polymerization may preferably be a radical polymerization or a polycondensation.

In one preferred embodiment of the present invention the coating composition may be of the kind which comprises activated ethylenically unsaturated double bonds and also at least one photoinitiator I which can be activated by the irradiated electromagnetic radiation to form radicals which start a radical polymerization.

The activated ethylenically unsaturated double bonds are preferably selected from the group consisting of acrylate groups, methacrylate groups, and vinyl ether groups, more preferably selected from the group consisting of acrylate groups and methacrylate groups.

The coating compositions may with advantage be of the kind described in WO 2005/119208 A1, page 5, line 7 to page 7, line 21 (corresponding to US 2008/0032037 A1, paragraphs [0033] to [0046]), this hereby being, by reference, expressly part of the present disclosure content.

The photoinitiators I that are present therein for the activation of the coating composition may be activatable, for example, by UV, IR and/or NIR radiation and/or by daylight, preferably by UV and/or IR radiation and/or by daylight, more preferably by UV radiation.

Photoinitiators of this kind which can be activated by UV radiation are known for example from WO 2005/119208 A1, page 7, line 23 to page 9, line 10 (corresponding to US 2008/0032037 A1, paragraphs [0047] to [0059]), this hereby being, by reference, expressly part of the present disclosure content.

Photoinitiators of this kind which can be activated by NIR or IR radiation are known for example from WO 2005/085372 A1, page 3, line 24 to page 5, line 18 (corresponding to US 2007/277700 A1, paragraphs [0013] to [0023]), this hereby being, by reference, expressly part of the present disclosure content.

It is possible to use an individual photoinitiator I in the coating composition or else a combination of two or more photoinitiators. The latter is preferred especially when in the apparatus of the invention the electromagnetic radiation is input via the needle 1 and also via the optional lighting units 8 and/or 10 in different wavelength ranges.

For example, a UV- and an NIR-activatable photoinitiator may be used in combination, or else two UV-activatable photoinitiators may be used, if they are activatable by sufficiently different wavelength ranges.

In one particularly preferred embodiment of the present invention, the coating composition comprises two-component polyurethane coating compositions whose polycondensation is triggered by a Lewis acid which is released by exposure to electromagnetic radiation.

The two-component polyurethane coating compositions are preferably coating compositions which comprise at least one polyisocyanate and at least one binder.

The polyisocyanate preferably comprises aliphatic or cycloaliphatic polyisocyanates having an NCO group functionality of at least two, generally with an NCO content, calculated as NCO=42 g/mol, of 5% to 25% by weight.

The binders may be, for example, polyacrylate polyols, polyester polyols, polyether polyols, polyurethane polyols; polyurea polyols; polyester polyacrylate polyols; polyester polyurethane polyols; polyurethane polyacrylate polyols, polyurethane-modified alkyd resins; fatty acid-modified polyester polyurethane polyols, copolymers with allyl ethers, graft polymers of the stated groups of compounds with, for example, different glass transition temperatures, and also mixtures of the stated binders. Preferred are polyacrylate polyols, polyester polyols, and polyurethane polyols.

Preferred OH numbers, measured in accordance with DIN 53240-2 (by potentiometry), are 40-350 mg KOH/g resin solids for polyesters, preferably 80-180 mg KOH/g resin solids, and 15-250 mg KOH/g resin solids for polyacrylate-ols, preferably 80-160 mg KOH/g.

The binders may additionally have an acid number as per DIN EN ISO 3682 (by potentiometry) of up to 200 mg KOH/g, preferably up to 150, and more preferably up to 100 mg KOH/g.

Particularly preferred binders are polyacrylate polyols and polyesterols.

Coating compositions of these kinds are described for example in WO 2009/050115 A1, page 30, line 22 to page 33, line 20, which hereby, by reference, is expressly part of the present disclosure content.

Lewis acids released by electromagnetic radiation are known for example from
WO 2009/050115 A1, page 2, line 4 to page 28, line 34,
WO 2011/032837 A1, page 1, line 35 to page 18, line 9, and
WO 2011/032875 A1, page 1, line 42 to page 14, line 4,
this being in each case hereby, by reference, expressly part of the present disclosure content.

Suitable in accordance with the invention are optically induced polymerizations with a long dark reaction, such as two-component or cationic reactions for pigmented coating compositions, for example.

"Long" here means that the time before a sudden rise in the viscosity of the coating composition, as a consequence of which the coating composition can no longer be processed in the spraygun, is preferably ten times longer than the residence time of the coating composition within the spraygun, calculated from the timepoint of exposure to the departure from the nozzle 14.

In this case it is preferred to select the layer thickness of the coating compositions at the locations of the lighting units 16, 8 and/or 10, during the exposure, to preferably be less than 1 mm, more preferably less than 100 µm, or very preferably less than 10 µm.

It is possible to use a single Lewis acid as photoinitiator I in the coating composition, or else a combination of two or more Lewis acids as photoinitiators. The latter is preferred especially when the electromagnetic radiation in the apparatus of the invention is input via the needle 1 and also via the optional lighting units 8 and/or 10 in different wavelength ranges.

For example, a UV-activatable photoinitiator and an NIR-activatable photoinitiator may be used in combination, or else two UV-activatable photoinitiators may be used, if they are activatable by sufficiently different wavelength ranges.

As further, typical coatings additives in the coating compositions it is possible for example for antioxidants, oxidation inhibitors, stabilizers, activators (accelerators), dyes, degassing agents, gloss agents, antistatic agents, flame retardants, thickeners, thixotropic agents, flow control assistants, binders, antifoams, fragrances, surface-active agents, viscosity modifiers, plasticizers, softeners, tackifying resins (tackifiers), chelating agents or compatibilizers to be added.

Pigmented coating compositions may also be used. This is conceivable particularly when the pigment is at least partly transparent for the irradiated electromagnetic wavelength range that activates the photoinitiator I. This is frequently the case for photoinitiators which can be activated in the IR or NIR range. However, even pigmented coating compositions which absorb in this wavelength range can be activated in the spraygun of the invention if the quantum yield of the photoinitiators within the spraygun is sufficiently high. This may be supported, furthermore, by the inclusion of static mixers, which circulate the coating composition in the exposed regions, thereby enlarging the exposable layer thickness.

It should be ensured that the coating composition to be applied has a viscosity that allows it to be applied by means of a spraygun. This application viscosity may be attained by mixing in solvent until the desired viscosity is reached.

Generally speaking, the viscosity of the radiation-curable coating composition ought to be from 10 to 10 000 mPas, preferably 10-1000 mPas at 25° C.

An advantage of the present invention is that as a result of the exposure within the spraygun, no electromagnetic radiation, or at least only lithe, penetrates to the outside, the radiation instead being almost completely absorbed within the gun, thereby removing the need for the painting operative to be workplace-protected against UV radiation.

The dose of electromagnetic radiation that is introduced within the coating composition can be increased by fitting out the surfaces opposite the lighting units such that they are reflective.

The lighting units 8 and 10 are preferably likewise provided with housings 15, so that electromagnetic radiation is unable to penetrate to the outside.

Relative to the prior art, the present invention represents an onward development not least since it is now possible, with the last-mentioned Lewis acids, to initiate a polycondensation in two-component polyurethane coating compositions, despite the fact that in the spraygun of the invention the exposure takes place only over the short section f, and/or g or h, in which the coating composition is exposed to the electromagnetic radiation for well below 1 second. If a long connecting piece 10 between reserve 11 and spraygun is used, with a large number of light sources, such as LEDs, the residence time may be in the region of seconds. This is surprising insofar as the prior-art DE 3702999 explicitly discloses exposure times of 5 seconds and 10 seconds for the initiation of the polymerization. Against the background of such long exposure times known from the prior art, it is surprising that, in such short exposure times as in the apparatus of the invention, radiation can be gotten into the coating composition to a sufficient extent and hence curing of the coating composition can be initiated.

In one inventively preferred combination, therefore, the portable spraygun described above is used for applying two-component polyurethane coating compositions to a substrate, the polycondensation of which coating compositions is triggered by a Lewis acid which is released by exposure to electromagnetic radiation.

The present invention further provides a method for applying a coating composition to a substrate by means of a spraygun, wherein the spraygun is a spraygun according to the invention and the coating composition is a coating composition of the kind whose curing can be carried out, or at least initiated, by electromagnetic radiation, preferably two-component polyurethane coating compositions whose polycondensation is triggered by a Lewis acid which is released by exposure to electromagnetic radiation.

The present invention further provides for the use of the spraygun according to the invention for applying coating compositions of this type to a substrate, the curing of which compositions can be carried out, or at least initiated, by electromagnetic radiation, preferably two-component polyurethane coating compositions whose polycondensation is triggered by a Lewis acid which is released by exposure to electromagnetic radiation.

The method of the invention is suitable for coating substrates such as wood, wood veneer, paper, paperboard, cardboard, textile, film, foil, leather, nonwoven, plastics surfaces, glass, ceramic, mineral building materials, such as molded cement blocks and fiber cement slabs or metals, each of which may have optionally been precoated and/or pretreated, preferably of wood, plastics, and metals, and more preferably of plastics and metals.

The method of the invention is particularly suitable for the coating of automobiles, (large) vehicles, aircraft, industrial applications, utility vehicles in agriculture and construction, decorative coatings, bridges, buildings, power masts, tanks, containers, pipelines, power stations, chemical plants, ships, cranes, posts, sheet piling, valves, pipes, fittings, flanges, couplings, halls, roofs, and structural steel, furniture, windows, doors, wood flooring; particular preference is given to the coating of automobiles, (large) vehicles, aircraft, and utility vehicles, very preferably of automobiles, and more particularly in refinish application.

REFERENCE SYMBOLS IN FIG. 1

1 needle
2 supply channel for at least one coating composition
3 supply channel for at least one gas (optional)
4 wall
5 outer surface of needle 1
6 surface of needle 1 at the tip
7 surface of wall 4 opposite surface 6
8 further lighting unit (optional)
9 window in wall 4 (optional)
10 further lighting unit
11 reserve
12 feedline
13 outlet
14 nozzle
15 housing over lighting units
16 lighting unit
a width of supply channel 2
b width of supply channel 3
c width of nozzle 14
d width of outlet 13
e diameter of needle 1
f length of exposure section 6
g length of exposure section 9
h length of exposure section 12
i diameter of feedline 12

The invention claimed is:

1. A portable spraygun comprising:
a supply channel for a radiation-curable coating composition,
a needle,
a reserve for the radiation-curable coating compositions directly connected to a body of the spraygun, and
optionally, a supply channel for a gas;
wherein the needle moves in a longitudinal direction and seals off the supply channel for the radiation-curable coating composition, which forms an annular gap around the needle, with respect to an outlet of the supply channel for the radiation-curable coating composition,
the optional supply channel for the gas, and the supply channel for the radiation-curable coating composition is disposed such that the radiation-curable coating composition, passed from the supply channel for the radiation-curable coating composition through the outlet, in atomized by the gas from the supply channel for the gas, or, in an absence of the supply channel for the gas, the radiation-curable coating composition is atomized by physical forces;
the reserve comprises a feedline from the reserve to the supply channel for the radiation-curable coating composition, and
either
(a) the needle is transmissive for electromagnetic radiation, and a lighting unit is connected to the needle, or
(b) the feedline is transparent for the electromagnetic radiation, and a lighting unit is mounted on the feedline, or
(c) both (a) and (b);
wherein exposure of electromagnetic radiation from the lighting unit occurs within the body of the spraygun.

2. The spraygun according to claim 1, wherein the needle comprises at least one a material selected from the group consisting of quartz, polymethyl methacrylate, sapphire glass, and calcite.

3. The spraygun according to claim 1, further comprising a wall, wherein a surface of the wall opposite a surface of the needle is reflective.

4. The spraygun according to claim 1, wherein the lighting unit is an ultraviolet (UV) light-emitting diode (LED) or a LED system mounted directly on the needle.

5. The spraygun according to claim 1,
wherein the lighting unit is mounted such that it emits electromagnetic radiation into the supply channel for a radiation-curable coating composition, through a window located in a region of the lighting unit, and
the window is transmissive for a wavelength range.

6. The spraygun according to claim 1, wherein the feedline has a diameter which allows a depth of penetration of the electromagnetic radiation into the radiation-curable coating composition that is sufficient for starting the curing.

7. The spraygun according to claim 1, wherein the feedline is replaceable and comprises transparent plastic.

8. A method, comprising applying a coating composition to a substrate with a spraygun,
wherein the spraygun is the spraygun according to claim 1, and
the coating composition is a coating composition in which curing can be carried out, or at least initiated, by electromagnetic radiation.

9. The method according to claim 8, wherein the coating composition comprises activated ethylenically unsaturated double bonds and a photoinitiator I, wherein the photoinitiator I is activated by the irradiated electromagnetic radiation to form radicals which start a radical polymerization.

10. The method according to claim 8, wherein the coating composition is a two-component polyurethane coating composition in which a Lewis acid is released by exposure to electromagnetic radiation, and the Lewis acid triggers polycondensation.

11. The spraygun according to claim 1, comprising one supply channel for the radiation-curable coating composition, one radiation-curable coating composition, and one supply channel for the gas.

12. The spraygun according to claim 1, comprising (a) the needle that is transmissive for the electromagnetic radiation.

13. The spraygun according to claim 1, comprising (b) the feedline that is transparent for electromagnetic radiation and the lighting unit that is mounted on the feedline.

14. The spraygun according to claim 1, comprising both (a) and (b).

15. The spraygun according to claim 1, wherein the needle has a diameter of from 0.5 to 10 mm.

16. The spraygun according to claim 1, wherein the needle has a diameter of from 2 to 5 mm.

17. The spraygun according to claim 1, wherein the material is quartz.

18. The spraygun according to claim 1, wherein the wavelength range is from 200 to 2500 nm.

* * * * *